United States Patent
Kawasaki et al.

(10) Patent No.: US 6,345,974 B1
(45) Date of Patent: Feb. 12, 2002

(54) EJECTOR PIN WITH PRESSURE SENSOR

(75) Inventors: Hiroaki Kawasaki; Yutaka Hiroshima; Chisato Akinari; Yasuo Ishiwata, all of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/263,823

(22) Filed: Mar. 8, 1999

(51) Int. Cl.$^7$ .......................... B29C 45/40; B29C 45/76
(52) U.S. Cl. ........................ 425/149; 249/67; 425/170; 425/436 RM; 425/444; 425/556
(58) Field of Search ................................ 425/139, 145, 425/149, 444, 436 RM, 556, 170; 249/67; 264/40.5; 73/756

(56) References Cited

U.S. PATENT DOCUMENTS

| | | | |
|---|---|---|---|
| 3,645,492 A | * 2/1972 | Edlis | 249/68 |
| 4,272,659 A | * 6/1981 | Orzel | 200/82 D |
| 4,372,741 A | * 2/1983 | Cane et al. | 425/556 |
| 4,457,180 A | * 7/1984 | List et al. | 73/756 |
| 4,647,275 A | * 3/1987 | Lundquist | 425/553 |
| 4,874,032 A | * 10/1989 | Hatamura | 164/457 |
| 5,134,888 A | * 8/1992 | Zylka et al. | 73/726 |
| 5,279,164 A | * 1/1994 | Araki et al. | 73/708 |
| 5,472,331 A | * 12/1995 | Watkins | 425/149 |
| 5,566,743 A | * 10/1996 | Guergov | 164/457 |
| 5,644,833 A | * 7/1997 | Starkey | 29/572.2 |
| 5,670,100 A | * 9/1997 | Ingram | 264/40.5 |

\* cited by examiner

Primary Examiner—Nam Nguyen
Assistant Examiner—Emmanuel Luk
(74) Attorney, Agent, or Firm—Oblon, Spivak, McClelland, Maier & Neustadt, P.C.

(57) ABSTRACT

An ejector pin with a pressure sensor is provided, of which the sensor output can be utilized without any correction even in different diameter thereof, so that no design changes are required according to loads to the ejector pin. The ejector pin has a bar portion for extruding a molded component and a sleeve portion slidably housing the bar portion. The end of the bar portion faces the cavity from the opening at the end of the guide portion. A housing room is defined by the step portion at the lower end of the sleeve portion. A strain producing portion with an U-shaped cross section fixed on the base end of the bar portion is disposed inside the housing room. A strain sensor is attached on the lower surface of the beam of the strain producing portion. Only the area of the end of the bar portion is related to the pressure detection. When the pressure of a resin is applied on the end of the bar portion, the downward load on the bar portion bends the beam down. The strain sensor outputs a signal corresponding to the load and the pressure is worked out. By separately preparing plural kinds of sleeve portions with different outer diameters, the thickness of an ejector pin can be arbitrarily set according to conditions.

6 Claims, 4 Drawing Sheets

EJECTOR PIN WITH PRESSURE SENSOR

BACKGROUND OF THE INVENTION

1. Field of the Invention This invention relates to an ejector pin with a pressure sensor that can detect the pressure from a resin filled within an injection mold cavity.

2. Description of the Related Art

FIG. 6 is an enlarged cross sectional view illustrating a metal mold for a conventional injection tool. The metal mold is formed of a load cell 111 which directly detects the pressure in a cavity 110 as well as a load cell 113 which is in contact with an ejector pin 112 extruding a molded component out of the cavity 110, but separately from the ejector pin 112. The load cells 111 and 113 are mounted by machining special holes and sleeves in the metal mold.

In the injection tool shown in FIG. 6, large load cells 111 and 113 cannot be mounted without machining the metal mold. Since being impossible to be machined, some metal molds cannot be mounted. Furthermore, since the mold machining wages, machining labor, and costs of the load cell itself are costly, it is difficult to adopt and widely use the present structure.

To solve such problems, the present applicant has proposed an ejector pin with a novel pressure sensor in which an ejector pin and a pressure sensor are integrated, instead of detecting the cavity pressure with an ejector pin and load cells. In the ejector pin 200 with a pressure sensor as shown in FIG. 7, the strain producing portion 201 with an U-shaped cross section is securely fixed on the base end of the ejector pin 200. A pressure sensor (not shown) is attached on the lower surface of the strain producing portion 201. The strain producing portion 201 is housed in the casing 202.

When the pressure in the cavity of the metal mold is added to the end of the ejector pin 200, the load according to the pressure receive area of the end occurs on the ejector pin 200. The sensor detects the deformation of the strain producing portion 201 due to the load. The pressure in the cavity is detected based on the output from the sensor by referring to previously prepared data representing the relationships between the output from the sensor and the pressure in the cavity.

In the ejector pin with the pressure sensor, a pressure sensor is integrally attached on the back end of the ejector pin, so that the effect can be expected of eliminating the step of machining a metal mold used to attach the pressure sensor.

In order to use an ejector pin, it is needed to suitably set the number of ejector pins and the thickness of an ejector pin according to conditions including the structure of a metal mold, the position at which an ejector pin goes against a molded component, and the shape and thickness of a molded component. Generally, where a relatively great number of ejector pins are disposed, the diameter thereof become relatively small. Where a small number of ejector pins are disposed, the diameter thereof becomes relatively large. Moreover, when a large force to peel off from the metal mold is needed due to differences in position where an ejector pin pushes against a molded component, thick ejector pins are needed. Thin ejector pins may be used when a relatively small force is sufficient for peeling.

However, the ejector pin with a pressure sensor proposed by the present applicant has the whole end surface of the ejector pin acting as a pressure receive surface. Even if the pressure of the cavity of the metal mold is the same, the pressure receive area depends on the diameter of the ejector pin, thus affecting the load applied to the ejector pin. Even if the pressure in the cavity is the same, the output of the pressure sensor varies by changing the thickness of the ejector pin under various conditions previously described. Hence, outputs from the sensor must be amended to agree with reference data showing the relationships between pressures in the cavity and sensor outputs. The following Table 1 shows the corresponding relationships between pin diameters (diameters) of an ejector pin, pressures in a cavity (resin pressures in a cavity), and loads applied on an ejector pin.

TABLE 1

| pin dia. | area cm$^2$ | \multicolumn{6}{c}{Pressure in Cavity (kgf/cm$^2$)} | | | | | |
|---|---|---|---|---|---|---|---|
| | | 500 | 600 | 700 | 800 | 900 | 1000 |
| 1 φ | 0.0079 | 3.93 | 4.71 | 5.50 | 6.28 | 7.07 | 7.85 |
| 2 φ | 0.0314 | 15.70 | 18.84 | 21.98 | 25.12 | 28.26 | 31.40 |
| 3 φ | 0.0707 | 35.33 | 42.39 | 49.46 | 56.52 | 63.59 | 70.65 |
| 4 φ | 0.1256 | 62.80 | 75.36 | 87.92 | 100.48 | 113.04 | 125.60 |
| 5 φ | 0.1962 | 98.10 | 117.72 | 137.34 | 156.96 | 176.58 | 196.20 |
| 6 φ | 0.2826 | 141.30 | 169.56 | 197.82 | 226.08 | 254.34 | 282.60 |

For example. as shown Table 1, when the pressure in the metal mold is 500 kgf/cm$^2$, the load on a 1 mmf ejector pin is 3.93 kgf while the load on a 6 mmf ejector pin is 141.30 kgf. Since the sensor output depends on the pin diameter even at the same mold pressure, correction thereof is required. As described above, the ejector pin with a pressure sensor proposed by the present applicant can solve the conventional long-waited problem. However, this type ejector pin requires mathematically processing the sensor output based on coefficients according to the pin diameter. The strain producing portion may be designed for each pin diameter by considering a difference in load due to a difference in pin diameter (different pressure receive area). However, this approach results in increased fabrication costs. When a pin with a large diameter causes a large load, the strain producing portion becomes large, thus exceeding the allowable space for suitable design. As a result, this ejector pin is not sufficiently practical.

Injector pins with large diameter are essential to deal with various release resistances without giving a pressure to a molded component. It has been difficult to the ejector pin with a pressure sensor previously proposed by the present applicant has a large diameter. Hence, the ejector pin with a pressure sensor is used only as the function of a pressure sensor by disposing it as a lightening pin at another place not requiring an ejector pin.

SUMMARY OF THE INVENTION

The present invention is made to overcome the abovementioned problems. The object of the invention is to provide an ejector pin with a pressure sensor that has a fixed pressure receive area (or load) even in different diameters thereof, so that the sensor output can be utilized without any change and no design changes are required according to the pressure receive area.

According to the present invention, in an ejector pin with a pressure sensor, wherein a resin is injected into a cavity formed between a female mold and male mold, the female mold and the male mold forming an injection mold, to mold a molded component, and said molded component is ejected with the end of the ejector pin when the male mold is relatively separated from the female mold, the ejector pin comprises a bar portion to which the pressure of an injected resin is applied; pressure sensing means fixed on a base end of the bar portion, for detecting a pressure applied to the bar portion; and a sleeve portion housing the bar portion and the pressure sensing means.

In the ejector pin according to the present invention, the pressure sensing means comprises a strain producing portion fixed on the base end of the bar portion and elastically deformed by a load applied to the bar portion and a sensor for detecting deformation occurring in the strain producing portion.

Moreover, in the ejector pin according to the present invention, the sleeve portion comprises a guide portion for axially and slidably guiding the bar portion, the end of the bar portion having an opening facing the cavity, and a housing room for housing the strain producing portion.

In the ejector pin according to the present invention, the end of the bar portion is substantially flush with the end of the guide portion in the sleeve portion.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
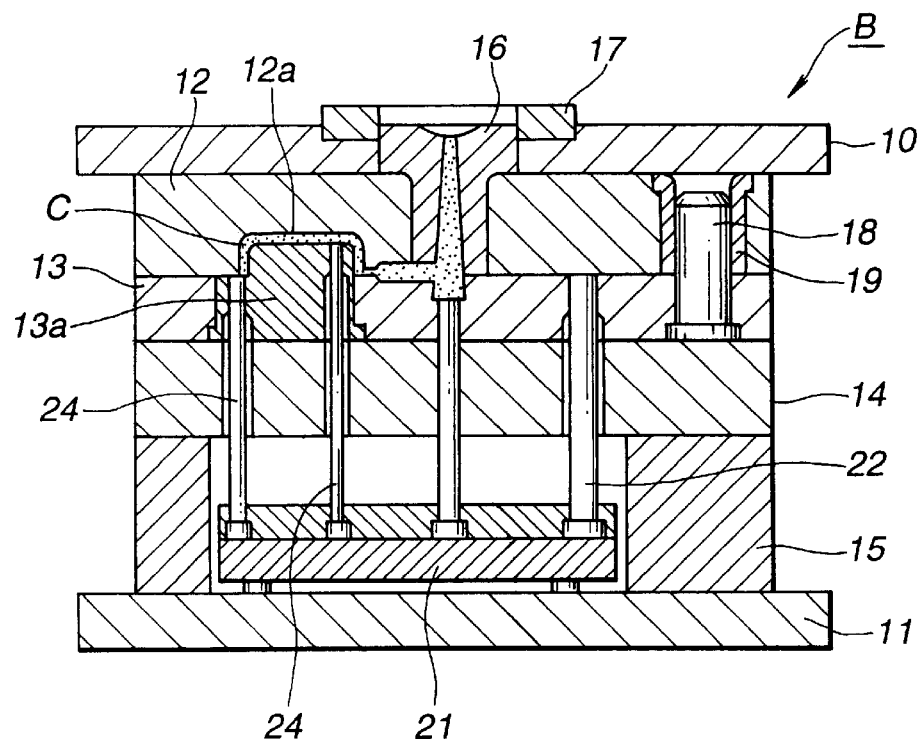
FIG. 1 is a cross sectional view illustrating an injection mold according to a first embodiment of the present invention.

An embodiment according to the present invention will now be described below in detail with reference to FIGS. 1 to 5. FIG. 1 is a cross sectional view illustrating an injection mold B. The injection mold B consists of a fixed-side mounting plate 10 attached to the fixed-side holder of an injection tool and a variable-side mounting plate 11 attached to the variable-side holder of the molding tool. A fixed-side mold plate 12 with a female cavity 12a is attached to the fixed-side mounting plate 10. A variable-side mold plate 13 with a male core 13a is attached to the variable-side mounting plate 11 via the receive plate 14 and the spacer block 15.

The injection mold B can be divided into the fixed-side mold plate 12 and the variable-side mold plate 13. In agreement with movement of the holder of the injection tool, the variable-side mold plate 13 moves virtually with respect to the fixed-side mold plate 12. This operation opens and closes the fixed-side mold plate 12 and the variable-side mold plate 13. A guide bush 19 is disposed to the fixed-side mold plate 12. A guide post 18 is disposed to the variable-side mold plate 13. In the open and close operation, the fixed-side mold plate 12 and the variable-side mold plate 13 are guided by the guide bush 19 and the guide post 18. When the fixed-side mold plate 12 and the variable-side mold plate 13 are closed, the cavity 12a is accurately combined with the core 13a.

A sprue 16 acting as a channel for injecting a molten resin into the injection mold B from the cylinder nozzle of the injection mold tool as well as a locator ring 17 acting as positioning means used when the injection mold B is attached to the cylinder nozzle of the injection mold B are attached to the fixed-side mounting plate 10. An ejector plate 21 is disposed on the side of the variable-side mounting plate 11. An ejector pin 24 with a pressure sensor (hereinafter referred to as an ejector pin) which extrudes a molded component out of the core 13a at the opening of the injection mold B is disposed to the ejector plate 21. A return pin 22 is disposed to the ejector plate 21 to return the ejector plate 21 to a predetermined position when the injection mold B is closed and to pull back the ejector pin 24.

Figure 2:
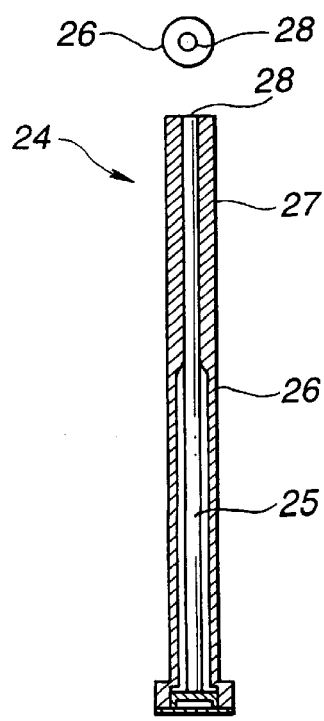
FIG. 2 a cross sectional view illustrating an ejector pin according to a first embodiment of the present invention.
Figure 3:
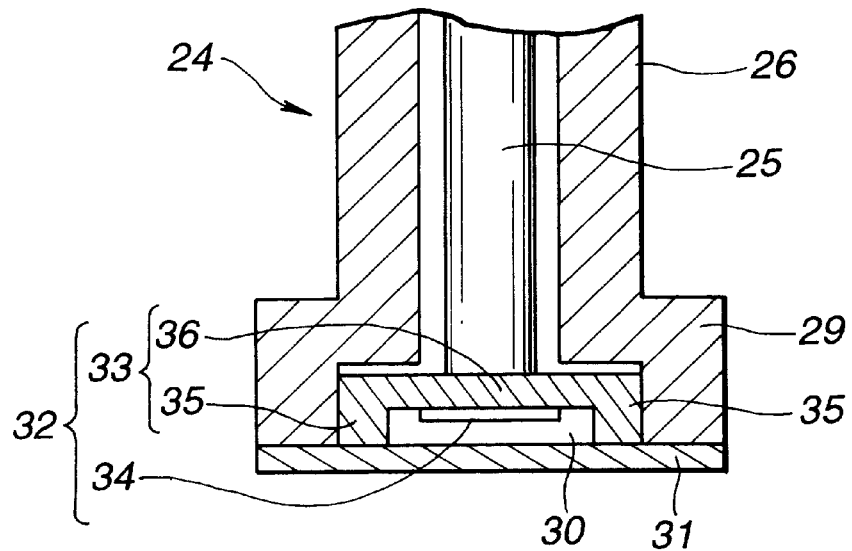
FIG. 3 is an enlarged cross sectional view illustrating a the base end portion of an ejector pin according to a first embodiment of the present invention.
Figure 4:
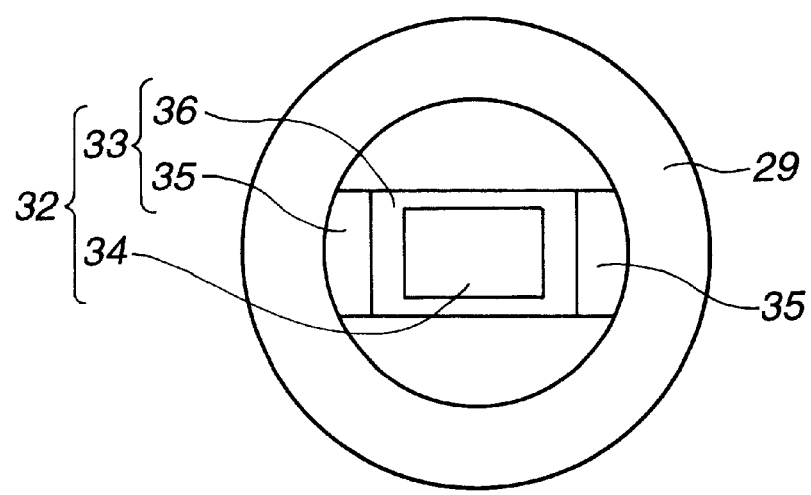
FIG. 4 is a bottom view illustrating the base end portion uncapped in an ejector pin according to a first embodiment of the present invention.

As shown in FIG. 2, the ejector pin 24 includes a bar portion 25 with a round cross section of which the end extrudes a molded component and a sleeve portion 26 which slidably houses the bar portion 25. The outer diameter of the sleeve portion 26 is nearly uniform. In the sleeve portion 24, the inner diameter of the upper half portion differs from that of the lower half portion. The upper half portion of the sleeve portion 26 corresponds to the guide portion 27 of the bar portion. In the guide portion 27, its inner diameter is nearly equal to its outer diameter. The guide portion 27 slidably and axially guides the bar portion 25. The end of the bar portion 25 faces the cavity 12a from the opening 28 at the end of the guide portion 25. The end surface of the bar portion 25 is substantially flush with the end surface of the guide portion 27. The inner diameter of the lower half portion of the sleeve portion 26 is larger than the outer diameter of the bar portion 25. As shown in FIGS. 3 and 4, a step 29 is formed on the back end portion of the housing room 30. The inner diameter of the housing room 30 is larger than the inner diameter of the lower half portion of the sleeve portion 26. The opening in the lower surface of the housing room 30 is closed with a round cover 31. A pressure detecting means 32 fixed on the base end of the bar portion 25 is disposed inside the housing room 30. The pressure detecting means 32 detects the pressure applied against the end of the bar portion 25. As shown in FIGS. 3 and 4, the pressure detecting means 32 includes a strain producing portion 33 fixed to the base end of the bar portion 25 and a strain sensor 34 acting as a pressure sensor attached to the strain producing portion 33. The strain producing portion 33 is a component with a nearly U-shaped cross section having a pair of supports 35 and 35 and a beam 36 connecting the pair of supports 35 and 35. The strain producing portion 33 is in contact with the inner surface of the cover 31 and the side peripheral surface of the housing room 30 and is separated from the beam 36. The base end of the bar portion 25 is securely fixed on the upper center surface of the beam 36. The beam 36 of the strain producing portion 33 elastically deforms under a load applied to the bar portion 25. The supports 35 and 35 bear the load. The strain producing portion 33 is integrally formed with a material with a strength factoring a necessary safety margin.

As shown in FIGS. 3 and 4, the strain sensor 34 is disposed on the nearly center lower surface of the beam 36. The strain sensor 36 is preferably a sensor for detecting elastic deformation of the beam 36. For example, a wire-resistance strain gauge which produces an elastic deformation of a resistance wire as a voltage change may be used as the strain sensor. Conductors (not shown) are derived out of the strain sensor 34 via through holes formed in the step 29 or the cover 31. Signal processing means (not shown) is disposed outside the mold. The signal processing means has data showing the relationships between the output from the strain sensor 34 and the pressure in the cavity. The signal processing means receives the signal from the strain sensor 34 and then outputs the pressure of the cavity. Dimensions of various positions of the above-mentioned structure is here shown as an example. The outer diameter of the bar portion 33 is 1.5 mm to 2 mm, if necessary, more. The longitudinal length of the strain producing portion 33 is 3 mm to 4 mm.

The outer diameter of the guide portion 27 of the sleeve portion 26 is an outer diameter of 4 mm to 20 mm. The outer diameter of the step 29 is more than 7 mm or 1.5 times the outer diameter of the guide portion 27.

Next, the function of the above-mentioned structure will be described below. In the step of injecting a resin into the injection mold B, when a molten resin is injected into the cavity 12a, a pressure of the resin is applied to the end of the ejector pin 24. In the ejector pin 24, only the area of the end surface of the bar portion 25 in the area of the ejector pin 24 serves as the pressure receive area related to pressure detection. That is, the circular surface of the end of the sleeve portion 26 does not work for pressure detection. When a resin pressure is applied to the end of the bar portion 25 and a lower load is applied to the bar portion 25, the bar portion 25 pushes down the beam 36 of the strain producing portion 25. When a load is applied to the nearly middle upper surface of the beam 36 supported by the supports 35 and 35, the beam 36 bends so that the strain sensor 34 produces a signal corresponding to the strain amount. The signal processing means receives the output from the strain sensor 34 and then determines the load according to the bending moment formula, thus working out the pressure of the cavity.

When a period of cooling time elapses after completion of the molding step, the mold component is taken out of the metal mold. In this case, the entire area of the end surface of the ejector pin 24 is involved in pulling out the molded component. That is, the bar portion 25 and the sleeve portion 26 are flush in contact with the molded component, thus providing necessary extrusion pressure.

As described above, in the ejector pin 24 of the embodiment, the bar portion 25 is disposed within the sleeve portion 26 and the pressure detecting means 32 detects only the load applied to the bar portion 25. Hence, the extrusion pressure of the ejector pin 24 is determined by the sum of the area of the end of the sleeve portion 26 and the area of the end of the bar portion 25. Thus, pressure detection can be always performed under fixed conditions by using the bar portion 25 with a uniformed thickness.

Figure 5:
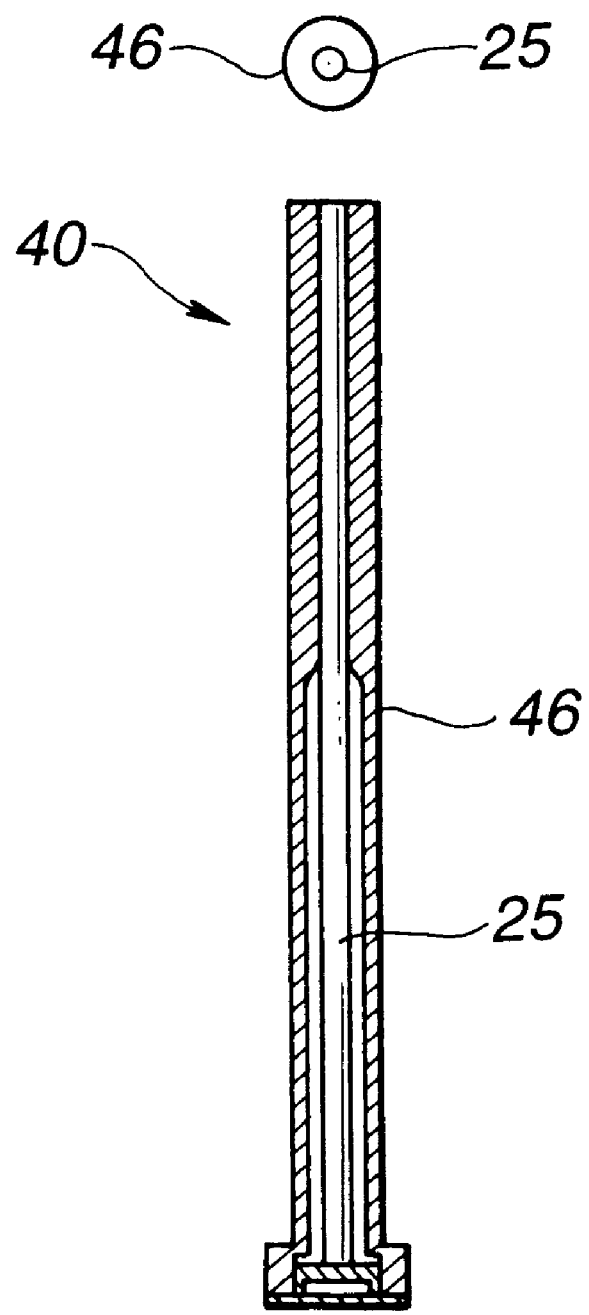
FIG. 5 is a cross sectional view illustrating an ejector pin with a different outer diameter according to a first embodiment of the present invention.
Figure 6:
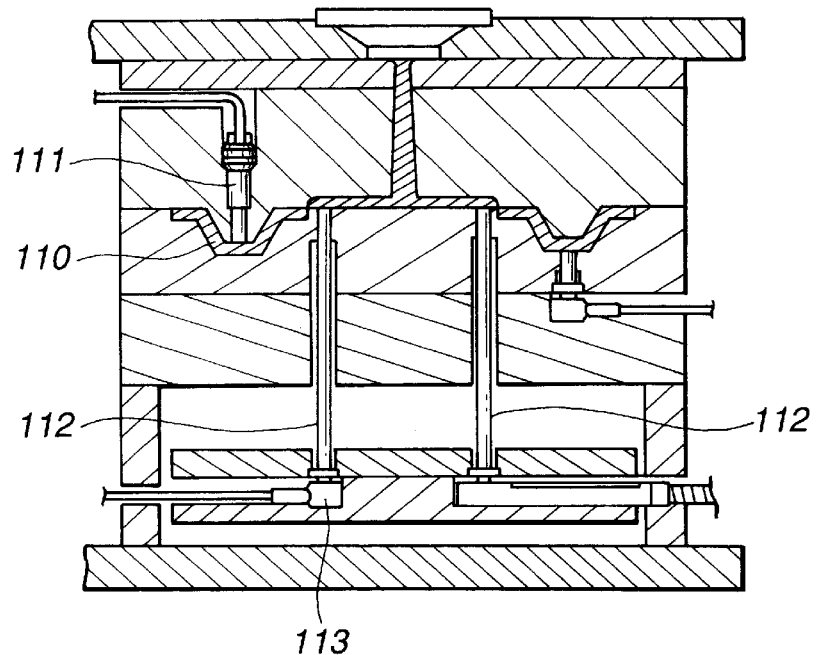
FIG. 6 is a cross sectional view illustrating a conventional injection mold.
Figure 7:
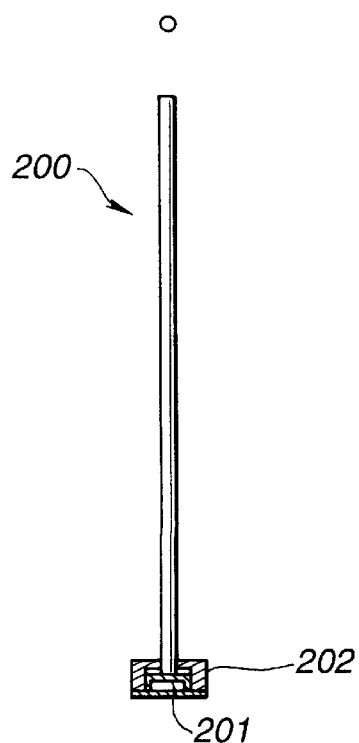
FIG. 7 is a cross sectional view and a plan view each illustrating an ejector pin with a pressure sensor previously proposed by the present applicant.

By separately preparing various kinds of sleeves 26 with different outer diameters and selecting an ejector pin which has its uniformed internal structure including the thickness of the bar portion 25, in spite of its different outline, the thickness of an ejector pin can be arbitrarily set based on requirements regarding the structure of the mold, the position where an ejector pin thrusts with a molded component, and the shape and size of a molded component. For example, the ejector pin 40, as shown in FIG. 5, has a thicker sleeve portion 46 than the ejector pin 24 as shown in FIG. 2. The entire outer diameter of the ejector pin 40 larger than that of the ejector pin 24 shown in FIG. 2 provides a larger pushing force. However, if the pressure in the cavity is the same, the load applied to the bar portion 25 is the same as that to the ejector pin 24 shown in FIG. 2. In a similar manner to that to the ejector pin shown in FIG. 2, the obtained signal can be processed without any correction.

As described above, according to the embodiment, even if the entire outer diameter of the ejector pin is varied by selecting a sleeve portion with a different outer diameter, the pressure receive area is constant. The sensor output can be used without any correction. It is not required to change the structure of the pressure detecting means according to the receive pressure area (load).

Moreover, in the ejector pin 24 with a pressure sensor according to the present embodiment, since the main body of the ejector pin 24 is integrated with the strain sensor 34, the metal mold does not require to be specially machined. The measurement points can be simply increased by using the ejector pin 24 in place of the conventional ejector pin. This feature allows the wave pattern of a pressure cycle in the metal mold to be examined more accurately.

According to the present invention, a piezoelectric transducer can be used as the sensor. The piezoelectric transducer generally has the structure formed of two layers of a molybdenum sulfide acting as a semiconductor material, an upper electrode and an lower electrode sandwiching the two layers, an insulating material such as polyimide encapsulating the two layers and the two electrodes, and terminals lead out of the two electrodes. In this case, the pressure detecting means has the structure where the lower end of the bar portion receiving a load pushes the piezoelectric transducer disposed in the housing room 30 so that a signal is produced. Both the end of the sleeve portion 26 and the end of the bar portion 25 guided into the sleeve 26 are formed identical to those in the above-mentioned example.

The ejector pin with a pressure sensor according to the present invention includes the bar portion to which the pressure in the cavity is applied, the pressure detecting means integrally disposed to the back end of the bar portion for detecting the pressure applied to the bar portion, and the sleeve portion housing the bar portion and the pressure detecting means. Hence, the following effects can be obtained:

Even if the diameter of the ejector pin is changed by varying the outer diameter of the sleeve portion, the pressure receive area is maintained constant, so that the sensor output can be used without any correction. This feature eliminates design changes according to the pressure receive area (load). Hence, the conventional man-hours needed to increase ejector pins with different diameters can be greatly reduced.

No need of machining a metal mold to dispose the pressure sensor eliminates the wages.

Since the ejector pin itself being a component of a metal mold has the function of a pressure sensor, it can be easily mounted and is formed of a reduced number of components.

Suitable molding conditions can be set by detecting the pressure in the cavity.

The pressure waveform lines can be obtained by displaying the detected pressure in the cavity. A suitable gate seal timing can be checked through an analysis of the pressure waveform lines while the molding conditions can be set over examining pressure waves.

The fluid analysis can be performed by arranging many ejector pins of the present invention in the cavity.

Since the ejector pin itself acts as a pressure sensor, a failure of an ejector pin during molding can be easily detected.

Since the pressure sensor can be mounted to the unmachined metal mold, the strength of the metal is maintained.

Since the pressure in the cavity can be detected, a breakage of the mold can be prevented under a suitably-controlled injection pressure.

Since the pressure sensor can be disposed at various places in the cavity, the resin injected in the cavity can be checked based on the pressure in the cavity.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An ejector pin with a pressure detecting means for use in an injection molding environment, wherein a molten resin is injected into a mold cavity formed between a female mold and a male mold, the female mold and the male mold together forming an injection mold means for molding a molded component after the molten resin sets, and the molded component being ejected with an end of said ejector pin when the male mold is relatively separated from the female mold, said ejector pin comprising:

a bar portion having a uniform diameter and first and second ends, wherein said first end of said bar portion faces the mold cavity formed in a fixed-side mold plate of the female mold so that a pressure of the molten resin, which has been injected into the mold cavity, is applied to said first end of said bar portion;

said pressure detecting means, fixed on a second end of said bar portion, for detecting the pressure of the molten resin, after the molten resin has been injected into the mold cavity and the pressure of the molten resin has been applied to said first end of said bar portion; and a sleeve portion being a hollow cylinder with a uniform outer diameter and a non-uniform inner diameter and telescopically housing said bar portion, wherein an end surface of said first end of said bar portion is substantially flush with an end surface of a first end of said sleeve portion so that both said end surface of said bar portion and said end surface of said sleeve portion contact a surface of the molded component to eject the molded component from the mold cavity.

2. The ejector pin defined in claim 1, wherein said pressure detecting means comprises a strain producing portion fixed on said second end of said bar portion and elastically deformed by the pressure applied to said bar portion and a sensor for detecting deformation occurring in said strain producing portion.

3. The ejector pin defined in claim 2, wherein said sleeve portion comprises a guide portion for axially and slidably guiding said bar portion, a first end of said sleeve portion which is adjacent to said first end of said bar portion having an opening facing the mold cavity, and said ejector pin further comprising a housing room for housing said strain producing portion.

4. An ejector pin with a pressure detector for use in an injection molding environment, wherein a molten resin is injected into a mold cavity formed between a female mold and a male mold, the female mold and the male mold together forming an injection mold configured to mold a molded component after the molten resin sets, and the molded component being ejected with end surfaces of both said ejector pin and a sleeve portion when the male mold is relatively separated from the female mold, said ejector pin comprising:

a bar portion having a uniform diameter and first and second ends, wherein said first end of said bar portion faces the mold cavity formed in a fixed-side mold plate of the female mold so that a pressure of the molten resin, which has been injected into the mold cavity, is applied to said first end of said bar portion;

said pressure detector, fixed on a second end of said bar portion, wherein said pressure detector is configured to detect the pressure of the molten resin, after the molten resin has been injected into the mold cavity and the pressure of the molten resin has been applied to said first end of said bar portion; and a sleeve portion being a hollow cylinder with a uniform outer diameter and a non-uniform inner diameter and telescopically housing said bar portion, wherein an end surface of said first end of said bar portion is substantially flush with an end surface of a first end of said sleeve portion so that both said end surface of said bar portion and said end surface of said sleeve portion contact a surface of the molded component to eject the molded component from the mold cavity.

5. The ejector pin defined in claim 4, wherein said pressure detector comprises a strain producing portion fixed on said second end of said bar portion and elastically deformed by the pressure applied to said bar portion and a sensor for detecting deformation occurring in said strain producing portion.

6. The ejector pin defined in claim 5, wherein said sleeve portion comprises a guide portion for axially and slidably guiding said bar portion, a first end of said sleeve portion which is adjacent to said first end of said bar portion having an opening facing the mold cavity, and said ejector pin further comprising a housing room for housing said strain producing portion.

* * * * *